Jan. 3, 1928.

H. W. INGLE 1,654,731

GLASS BLOWING MACHINERY

Filed March 11, 1925

Inventor
Henry W. Ingle
by Robson A Brown
Attorney.

Patented Jan. 3, 1928.

1,654,731

UNITED STATES PATENT OFFICE.

HENRY W. INGLE, OF HARTFORD, CONNECTICUT, ASSIGNOR TO HARTFORD-EMPIRE COMPANY, OF HARTFORD, CONNECTICUT, A CORPORATION OF DELAWARE.

GLASS-BLOWING MACHINERY.

Application filed March 11, 1925. Serial No. 14,670.

This invention relates to glass-working machines and has particular relation to the type in which mold charges are delivered from a glass feeding device through a chute and a funnel to inverted parison molds, and in which each mold charge is first settle-blown in the mold to form the finish at the mouth of the ware and is then counterblown to shape the parison.

One of the objects of this invention is to provide a simple and efficient mechanism for applying settle-blowing pressure immediately following the introduction of a mold charge into the mold through the funnel, by bringing a blow head into operative relation to the previously positioned funnel and applying blowing pressure therethrough. The application of settle-blowing pressure through the funnel reduces, by the time otherwise required for removing the funnel, the interval of time between the mold-charging and settle-blowing operations.

A further object of the invention is to provide a blow head which alternately functions to apply settle-blowing pressure to the mold, and to provide a baffle or closure for the parison mold during the application of counterblowing pressure subsequent to the removal of the funnel, thereby reducing the number of operative parts and lessening the cost of the apparatus.

Figure 1:
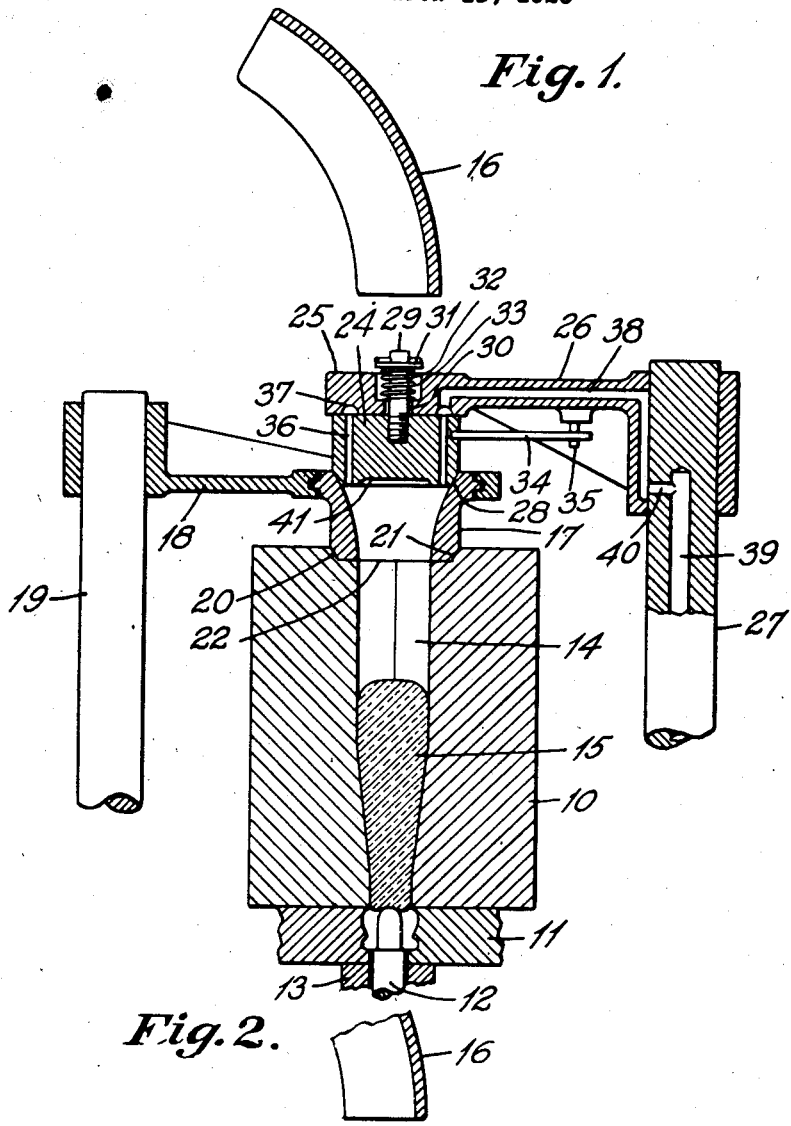
Figure 2:
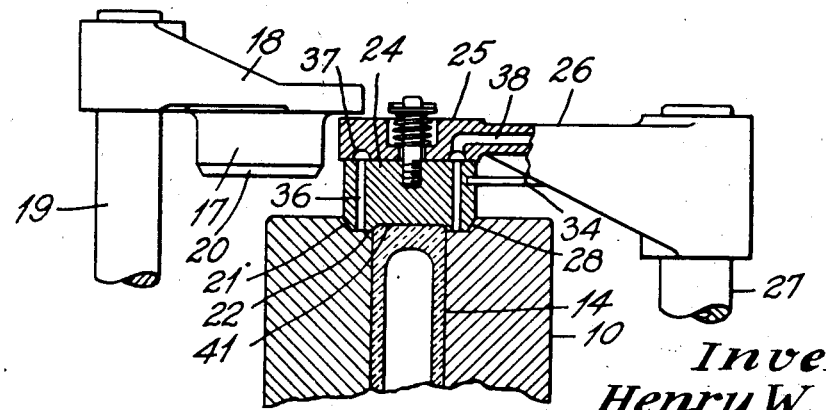

In the accompanying drawings:

Figure 1 is a vertical sectional view showing the apparatus in position for settle blowing; and Fig. 2 is a similar view showing the apparatus in position for counterblowing.

Referring to the drawings, the numeral 10 indicates an inverted parison mold having in cooperation therewith at its neck portion a neck ring 11 and a neck plunger 12 for forming the finish on the ware. The mold 10 may be mounted on a rotary mold-table, or may be disposed at a fixed station, as in the individual-section machine shown in my copending application for Letters Patent, filed August 30, 1924, Serial No. 735,079. The neck plunger 12 is positioned within a head 13 through which counterblowing pressure is applied, the plunger being arranged for vertical movement in the usual manner.

The mold 10 has a cavity 14 which is open to the atmosphere at the top to receive a mold charge 15 which is delivered thereto from a deflector 16 cooperating with the chute of a glass feeding machine, not shown.

For the purpose of guiding the mold charge 15 into the mold cavity 14, a funnel 17 is loosely mounted on one end of an arm 18 so as to permit a sufficient amount of floating movement to insure proper horizontal positioning thereof with respect to the mold. The other end of the arm 18 is secured to a rod 19 which is oscillated horizontally to move the funnel to and from a position in vertical alignment with the mold 10. Vertical motion is also imparted to the rod 19, in order to raise and lower the funnel 17 out of and into operative position with respect to the mold 10. The oscillation and vertical motion of the rod 19 may be produced by any well known or desired mechanism and it is therefore not considered necessary to illustrate such mechanism herein.

The lower edge of the funnel 17 is provided with an annular taper 20 for cooperation with a corresponding taper 21 formed in a recess 22 of the mold, thereby insuring both an accurate registry and an air-tight joint between the funnel and the mold. Settle-blowing pressure is applied to the mold 10 to pack the mold charge therein for forming the finish of the ware, by means of a blow head 24, carried by a head 25 on the end of an arm 26 which is secured to a vertical rod 27. The rod 27 is oscillated to move the blow head into and out of axial alignment with the funnel, and is vertically reciprocated to move the blow head into and out of operative position with respect thereto, by mechanism not shown.

The lower edge of the blow head 24 is provided with an annular bevel 28 which is adapted to conform both to the correspondingly beveled portion 22 provided in the upper edge of the funnel and to the beveled portion 21 of the parison mold.

The blow head 24 is resiliently secured to the head 25 to allow a limited amount of horizontal floating movement in order to insure an accurate registry and an air-tight fit between the blow head and the mold 10 and between the blow head and the funnel 17 when the blow head is moved into operative position with either of these elements. This is accomplished by providing in the top of the blow head 24 a stud 29 which extends loosely through an aperture 30 formed in the head 25. A washer 31 is secured to the upper extremity of the stud 29 and bears upon a coiled spring 32 which surrounds the stud 29 and which is seated in a recess 33 formed in the upper surface of the head 25. The blow head 24 is prevented from rotating with respect to the head 25 by a horizontal rod 34 which is secured at one end to the blow head and which passes between two pins 35 carried by the arm 26, only one of these pins being shown on the drawing.

Settle-blowing pressure is conducted to the interior of the mold 10 through a plurality of passages 36 provided in the blow head 24. These passages communicate with an annular passage 37 which is provided in the lower surface of the head 25 and which communicates with a passage 38 in the arm 26. The passage 38 communicates with a passage 39 provided in the rod 27 through a port 40. The passages 36 are so positioned that they communicate with the interior of the funnel 17 when applying settle blowing pressure to the mold, but when the blow head 24 is lowered to provide a closure for the mold during the counterblowing operation, the passages 36 are closed by the upper surface of the recess 22 in said mold, as shown in Fig. 2.

A recess or depression 41 is formed in the bottom of the blow head 24 and is adapted to register with the mold cavity 14 to provide a bottom mold for the parison of the proper shape.

In operation, the funnel is swung over and down to a proper seating contact with the mold prior to the delivery of a mold charge. After the charge has entered the mold, the blow head is immediately swung into alignment with both the funnel and the mold, and is then lowered and correctly positioned in registry with the funnel, (Fig. 1) clamping the latter firmly in position. Settle-blowing pressure is then admitted to the mold through the several ports and passages of the blow head structure to pack the glass around the neck plunger and thus form the finish at the mouth of the ware.

The blow head is then raised to a position which will allow the funnel to be lifted and swung aside by the funnel arm, and the neck plunger is withdrawn downward in the usual manner. The blow head then descends and positions itself within recess 22 of the mold (Fig. 2), and is so placed that the bottom-forming depression 41 in the blow head will register with the mold cavity and provide a bottom therefor having the proper configuration to form the bottom of the parison. Counterblowing pressure is then applied through the head 13 to form the parison, after which the blow head is raised sufficiently to clear the mold, which is then free to be opened or moved to another station for subsequent operations.

The specific structure shown herein may be varied as desired, within the scope of the appended claims.

1. In glassworking apparatus the combination with a mold, a funnel mounted for movement into and out of operative position relative to said mold, and a device mounted for movement into operative position relative to said funnel when said funnel is in operative position relative to said mold to apply settle blowing pressure therethrough and into operative position relative to said mold when said funnel is out of operative position relative thereto to provide a bottom closure therefor.

2. In glassworking apparatus the combination with a mold, a funnel mounted for movement into and out of interlocking engagement with said mold, and a device mounted for movement into interlocking engagement with said funnel when said funnel is in engagement with said mold to apply settle blowing pressure therethrough and into interlocking engagement with said mold when said funnel is out of engagement therewith to provide a bottom closure therefor.

3. In glassworking apparatus the combination with a mold, a funnel mounted for movement into and out of operative position relative to said mold, and a device mounted for movement into operative position relative to said funnel when said funnel is in operative position relative to said mold and into operative position relative to said mold when said funnel is out of operative relation thereto, said device having passageways provided therein which are arranged to communicate with said mold through said funnel for the application of settle blowing pressure but closed to said mold when said device is moved into operative position relative thereto.

4. In a glassworking apparatus the combination with a mold, a funnel mounted for movement into and out of operative position relative to said mold, and a device mounted for movement into operative position relative to said funnel when said funnel is in operative position relative to said mold to apply settle blowing pressure therethrough and into operative position relative to said mold when said funnel is out of operative position relative thereto, to provide a bottom closure therefor, said device having a passageway therein to admit settle blowing air through said funnel and adapted to be closed when said device is moved into operative position relative to the mold, said device being also provided with a molding bottom contour adapted to cooperate with that of said mold when said device is moved in operative position relative to said mold.

5. In glass working apparatus, the combination of mold, a funnel adapted to be raised, lowered and moved laterally to bring the funnel into and out of engagement with said mold, and a device arranged to alternately function as a settle-blowing mechanism and as a bottom closure for said mold, the said device being adapted to be raised and lowered and moved laterally independently of said funnel to bring said device into and out of operative engagement alternately with said funnel and mold.

6. In glassworking apparatus the combination of a mold having a recess in the upper portion thereof surrounding the mold cavity, a funnel mounted for movement into and out of operative position relative to said mold and having the lower portion thereof shaped to fit within said recess, and a combination blow head and bottom closure mounted for movement into operative position relative to said funnel when said funnel is in operative position relative to said mold to apply settle blowing pressure therethrough and into operative position relative to said mold when said funnel is out of operative position relative to said mold to provide a bottom closure therefor, said blow head and bottom closure having the lower portion thereof shaped to fit within both said funnel and the recess in said mold.

7. In glassworking apparatus the combination of a mold having a recess in the upper portion thereof surrounding the mold cavity, a funnel mounted for movement into and out of operative position relative to said mold and having the lower portion thereof shaped to fit within said recess, a combined blow head and bottom closure mounted for movement into operative position relative to said funnel when said funnel is in operative position relative to said mold to apply settle blowing pressure therethrough and into operative position relative to said mold when said funnel is out of operative position relative thereto to provide a bottom closure therefor, said blow head and bottom closure having the lower portion thereof shaped to fit within both said funnel of the recess in said mold, a floating support for said funnel to permit it to center itself with respect to said mold and a floating support for said blow head and bottom closure to permit it to center itself with respect to both said funnel and said mold.

8. In glass-working apparatus, the combination of a mold having a recess provided in its upper end surrounding the mold cavity, a funnel having its lower portion shaped to fit in said recess and mounted for movement into operative engagement therewith to direct mold charges into said cavity, and a blow head having its lower portion shaped to fit within said funnel and also to fit within said recess in said mold and mounted for movement alternately into operative engagement with said funnel and said mold to respectively apply a settle blowing pressure through said funnel and provide a bottom closure for said mold.

9. In glass working apparatus the combination of a mold having a recess at its upper end surrounding the mold cavity, a funnel mounted for movement into and out of operative position relative to said mold and having the lower portion thereof shaped to fit within said recess, and a blow head mounted for movement into operative position relative to said funnel when said funnel is in operative position relative to said mold and into operative position relative to said mold when said funnel is out of operative position relative thereto, and having its lower portion shaped to fit within both said funnel and the recess in said mold, the said blow head having an air passageway therein for the application of settle blowing pressure which is open when said blow head fits in said funnel, but which is closed by said mold when said blow head fits in said mold recess.

10. In glassworking apparatus, the combination of a mold having a recess in its upper end surrounding the mold cavity, a funnel mounted for movement into and out of operative position relative to said mold and having the lower portion thereof shaped to fit within said recess, a blow head mounted for movement into operative position relative to said funnel when said funnel is in operative position relative to said mold and into operative position relative to said mold when said funnel is out of operative position relative thereto and having the lower portion thereof shaped to fit within said funnel and also within the recess in said mold, and means for permitting said funnel and said blow head to center themselves with respect to each other and with respect to said mold recess when moved into engagement therewith.

11. In glass working apparatus, the combination of a mold having an annular recess in its upper end, a funnel having its lower portion shaped to fit in said annular recess, a supporting member on which said funnel is loosely mounted for limited lateral freedom of movement, a blow head having its lower portion shaped to fit within said funnel and also to fit within said annular recess, a member for supporting said blow head, means for attaching said blow head to said supporting member resiliently and with limited lateral freedom of movement, and means for conducting air to said blow head, both the said funnel-supporting member and the said blow head-supporting member being independently movable vertically and being also oscillable around vertical axes.

12. In glass working apparatus, the combination of a mold having a tapered annular recess in its upper end, a funnel having its lower end tapered to fit in said annular recess and having a flaring internal portion similar in size and shape to said annular mold recess, a horizontal arm for supporting said funnel and having a seat in which said funnel is mounted loosely and with limited freedom of lateral movement, a vertical rod supporting said arm, said rod being movable vertically and being also oscillable around its axis, a blow head having its lower end tapered to fit in said flaring funnel portion and also to fit in said mold recess, a horizontal arm for supporting said blow head, vertically resilient means for attaching said blow head to said arm with limited freedom of lateral movement, vertical air channels in said blow head, the lower ends of said channels being open when said blow head fits within said funnel and being closed when said blow head fits within said mold recess, a vertical rod supporting said blow head arm, said rod being movable vertically and oscillable around its axis, channels in said blow head arm and in its supporting rod for conducting air to the said air channels of said blow head, and means for preventing substantial relative movement between said blow head and its supporting arm.

Signed at Hartford, Conn., this 10th day of March 1925.

HENRY W. INGLE.